Feb. 12, 1963 E. F. SIMAS 3,077,239
AUTOMOBILE SPEED CONTROL DEVICE
Filed May 27, 1960 4 Sheets-Sheet 1

INVENTOR.
Edward F. Simas
BY
Salter + Michaelson

Feb. 12, 1963
E. F. SIMAS
3,077,239
AUTOMOBILE SPEED CONTROL DEVICE
Filed May 27, 1960
4 Sheets-Sheet 2
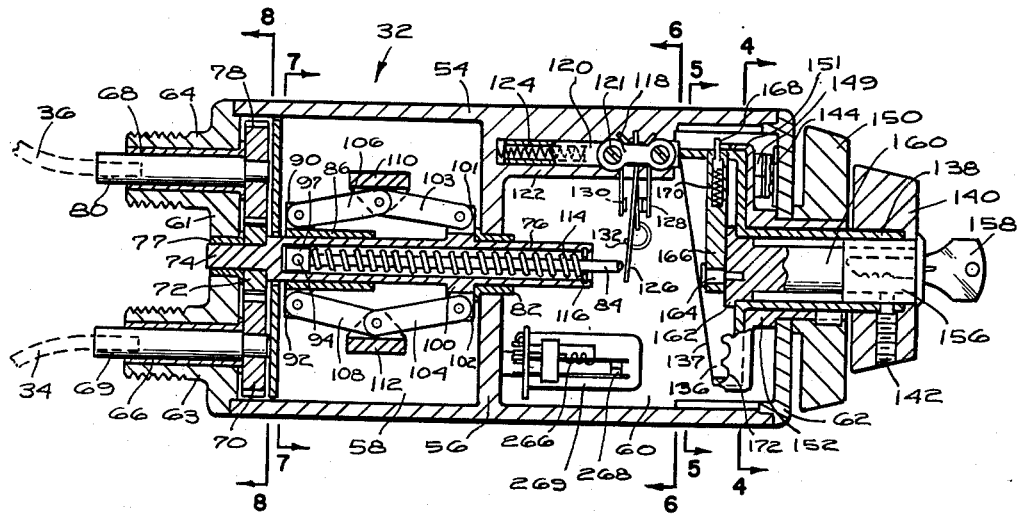
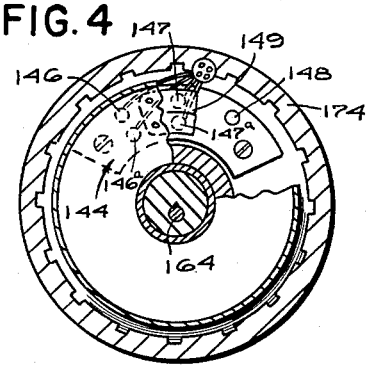
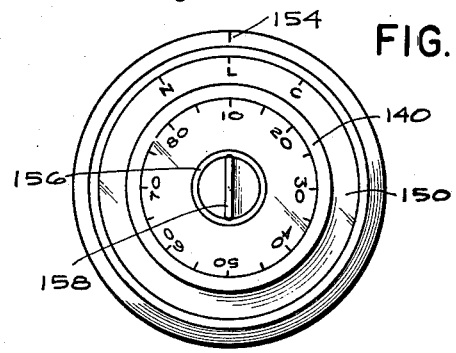
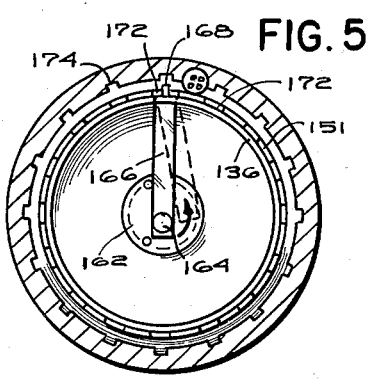
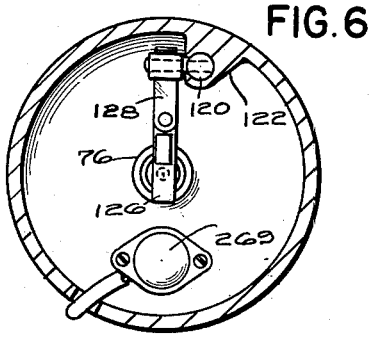
INVENTOR.
Edward F. Simas
BY
Salter & Michaelson

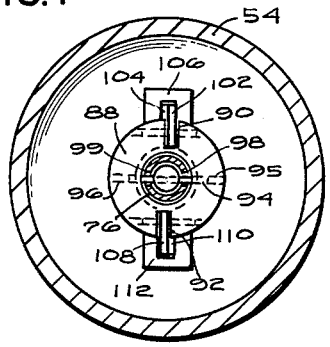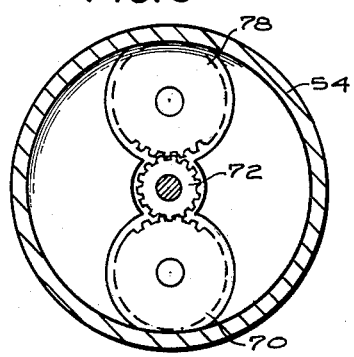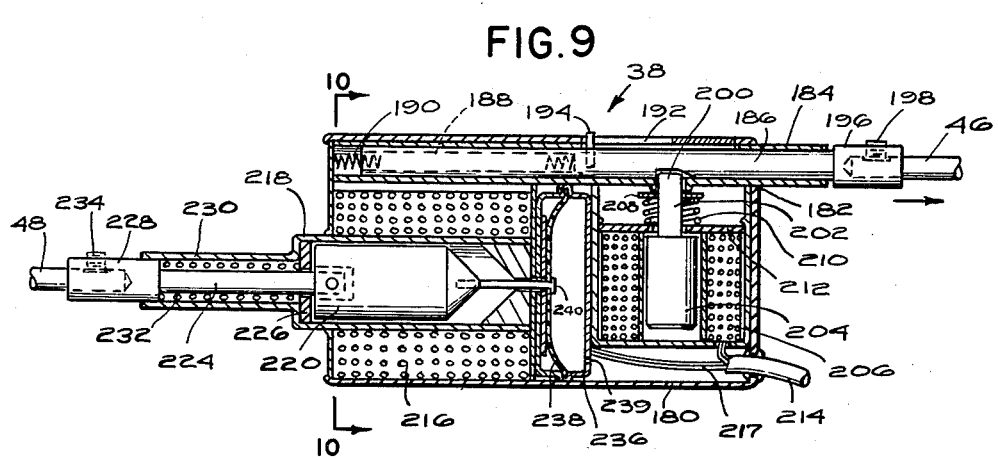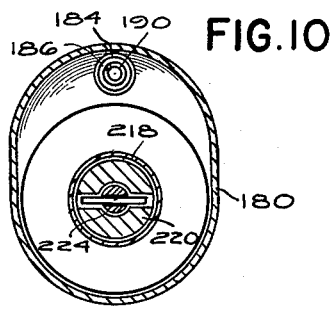

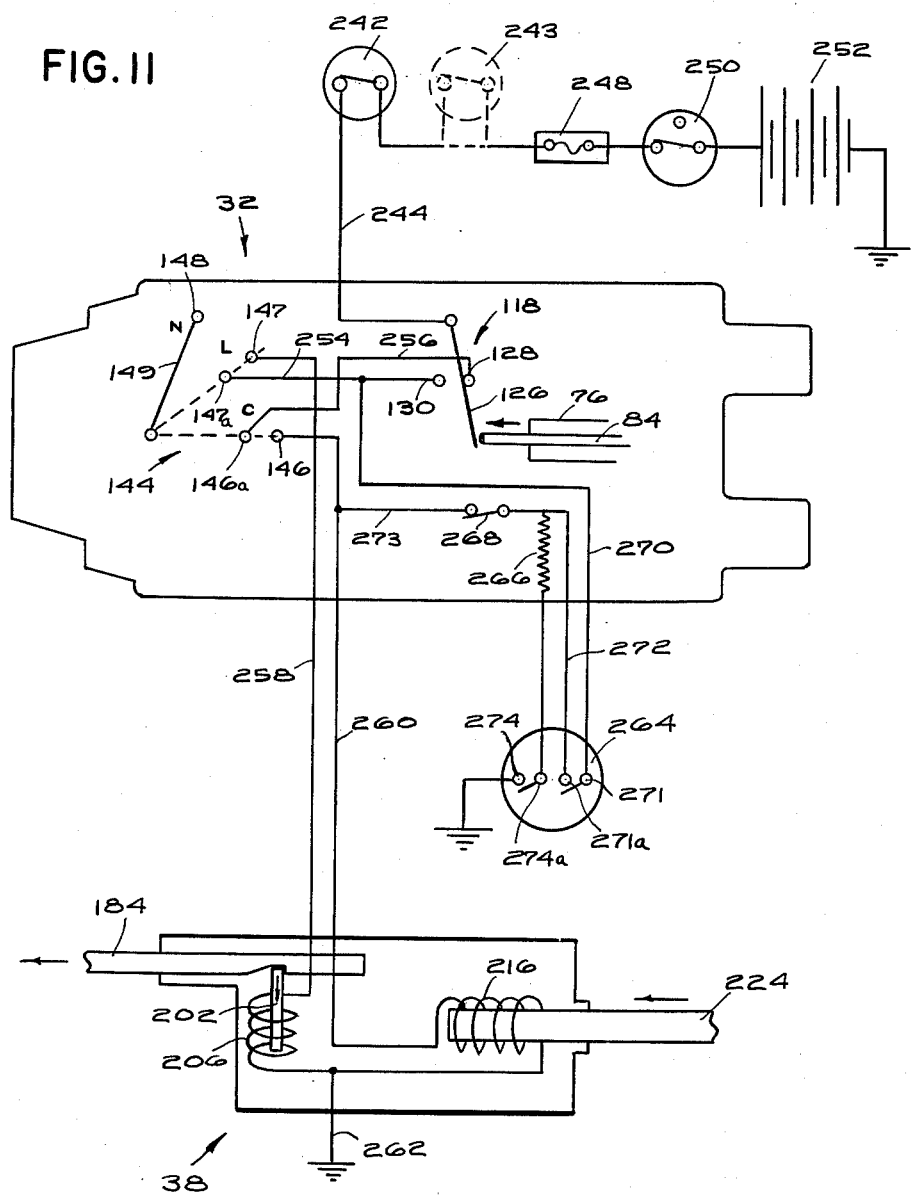

United States Patent Office 3,077,239
Patented Feb. 12, 1963

3,077,239
AUTOMOBILE SPEED CONTROL DEVICE
Edward F. Simas, 37 Westwood Road, Saylesville, R.I.
Filed May 27, 1960, Ser. No. 32,363
10 Claims. (Cl. 180—82.1)

The present invention relates to a device for automatically controlling the speed of a motor vehicle. More particularly, the present invention relates to an automobile speed control device that is adapted to be selectively operated to either provide for constant speed operation of the automobile or to control the operation of the automobile so that a predetermined speed will not be exceeded.

The mounting death tolls resulting from automobile accidents have caused great concern among local and national groups. These groups have dramatically illustrated that each year property damage alone due to automobile accidents has exceeded many millions of dollars, and the figure is still growing. However, property damage is insignificant when compared with the tragic death rate that each year exceeds deaths due to any other cause. Automobile accidents generally occur as a result of driver fatigue or excessive speeds which if checked or minimized would greatly reduce the hazard of driving and thereby reduce the possibility of accidents.

The present invention was developed in order to selectively control the operation of an automobile so that a constant speed may be automatically maintained, thereby reducing the strain on the driver and accordingly minimizing driver fatigue. The invention further provides for selectively controlling the automobile so that a predetermined speed may not be exceeded, thereby providing a governor control for the automobile.

In controlling the speed of the automobile, the automatic constant speed control feature embodied herein enables the automobile to be driven at any selected speed without the use of the manual foot accelerator. By eliminating the need to constantly maintain the foot on the accelerator and yet provide for a constant speed of the vehicle at any selected value, the driver of the vehicle will be relieved of a strain that occurs particularly on long trips, although it is to be emphasized that this feature of my invention is also of considerable utility and value when driving at a steady pace in city traffic. The invention further includes means for preselecting the maximum speed at which the vehicle can be operated and thus provides a governing device for the vehicle which has considerable utility when the vehicle is used by a minor. Both the constant speed control means and the speed limit control means are adjustable so that any speed may be selected as the constant speed or the maximum speed at which the vehicle may be operated.

Accordingly, it is an object of the present invention to provide an automatic speed control device for use in a motor vehicle that is adapted to control the operation of the vehicle at a preselected speed and that may further be operable to prevent operation of the vehicle at greater than a predetermined speed.

Another object of the invention is to provide an automatic constant speed control device which permits driving of the automobile at any selected speed without the use of the accelerator.

Still another object is to provide a governor speed control wherein the automobile is prevented from exceeding a preselected speed.

Still another object is to provide accelerator control means for use with the speed limit control feature wherein the control means for the speed limit control is deactivated to permit momentary acceleration in emergency situations such as in the passing of other automobiles.

Still another object is to provide a time limit accelera-tion control device that permits the momentary deactivation of the speed limit control means during emergency or passing situations but that is adapted to permit the reactivation of the speed limit control means after a predetermined period of time.

Still another object is to provide a speed-limit control device that may be locked in a preselected position by a removable key.

Still another object is to provide a constant-speed control device for use in a motor vehicle that is adapted to be deenergized upon actuation of the brake pedal of the vehicle.

Still another object is to provide a feature or operation selection switch wherein either constant speed control or limit speed control may be selected as desired, a further selection rendering said controls inoperative, thereby permitting the vehicle to be operated in its usual manner.

Still another object is the provision of an automatic speed control device for use in a motor vehicle that is operable whether the vehicle is going forward or in reverse.

Still another object is the provision of an automatic speed control device embodying both a constant-speed control and a limit-speed control wherein either of these controls may be selected and put into operation while the vehicle is in motion, and wherein the desired speed for the selected control can also be selected or varied while the vehicle is in motion.

Still another object is the provision of an automatic speed control device which is applicable to motor vehicles having either standard or automatic transmissions.

Still another object is the provision of a constant speed control which will be operable at low speeds as well as relatively high speeds, and which will maintain the vehicle at relatively constant speed even under varying power demands, such as when going up inclines, around curves, etc.

Other objects and the nature and advantages of the instant invention will be apparent from the following description when taken in conjunction with the accompanying drawings, wherein:

FIG. 2 is a vertical sectional view of the control unit embodied in the present invention;

FIG. 3 is a front elevational view of the control unit illustrated in FIG. 2 and showing the operation selector dial and the speed selector dial;

FIG. 4 is a sectional view taken along lines 4—4 in FIG. 2;

FIG. 5 is a sectional view taken along lines 5—5 in FIG. 2;

FIG. 6 is a sectional view taken along lines 6—6 in FIG. 2;

FIG. 7 is a sectional view taken along lines 7—7 in FIG. 2;

FIG. 8 is a sectional view taken along lines 8—8 in FIG. 2;

FIG. 9 is a sectional view of the accelerator control unit that is electrically connected to the control unit and that is operatively connected to the accelerator and the carburetor of the vehicle;

FIG. 10 is a sectional view taken along lines 10—10 in FIG. 9; and

FIG. 11 is a diagrammatic illustration of the electrical circuit embodied in the present invention.

Figure 1:
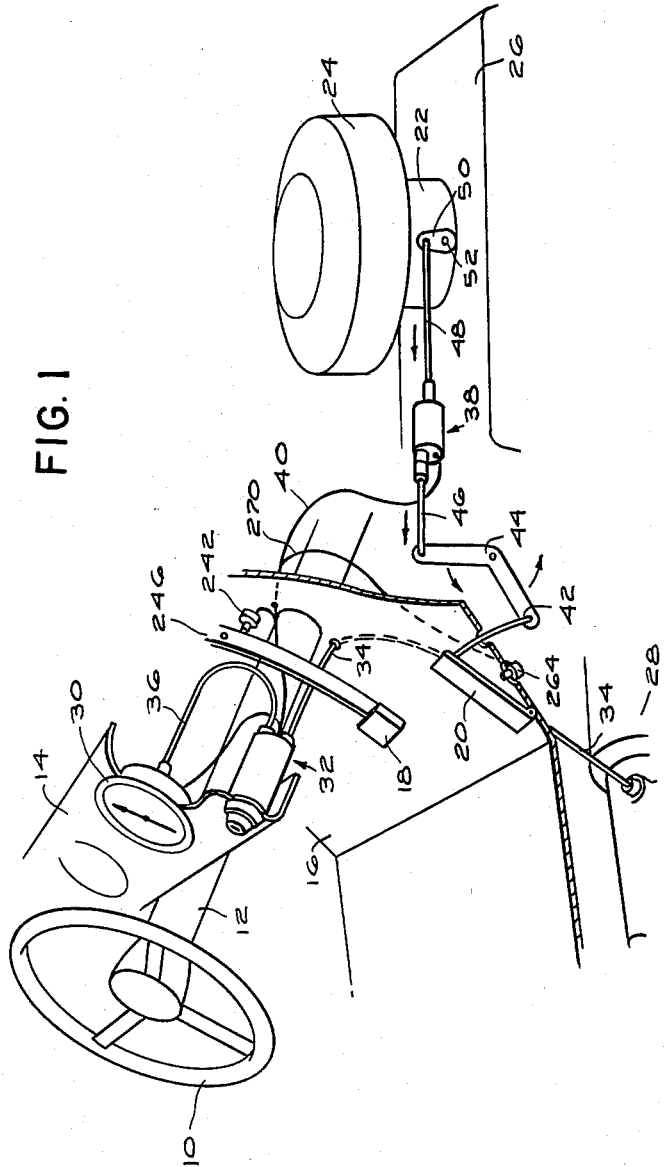
FIG. 1 is a perspective view of a portion of an automobile illustrating the control therefor and showing the manner in which the component parts of the present invention are installed therein.

Referring now to the drawings and particularly to FIG. 1, the invention embodied herein is shown as it is installed in a conventional automobile. It is important to note that the component parts of the speed control device may be applied to any conventional automobile without materially altering the constructional details thereof, and this is true whether the automobile has standard or automatic transmission. Thus the invention may be manufactured as a separate unit and installed in any conventional automobile with only minor adjustments being necessary to adapt the control device to the existing operating mechanism of the automobile. As shown in FIG. 1, the operating apparatus that is located adjacent to the driver's seat in a conventional automobile is illustrated and includes a steering wheel 10 that is mounted on a steering column 12, the steering column 12 extending beneath a dashboard 14 and through a floor board 16. A brake pedal 18 is conventionally mounted over the floor board 16, and an accelerator pedal 20 is pivotally secured to the floor board 16 and is operatively connected to a control rod, to be described hereinafter, that controls the flow of fuel to a carburetor indicated at 22. It will be understood that the automobile herein illustrated is of the automatic transmission variety since no clutch pedal is shown. An air filter 24 is mounted on the carburetor 22 in the conventional manner, the carburetor 22 being mounted on the block of a motor that is indicated at 26. A transmission, a portion of which is indicated at 28, is mounted below the floor board 16 and is adapted to transfer the drive from the motor 26 to the rear wheels of the vehicle as is well known in the art. As will be described below, the control device which is the subject of the present invention is connected directly to the transmission 28 and is responsive to the rotation thereof for controlling the speed of the vehicle. Mounted on the dashboard 14 is a speedometer 30 that may be of any conventional design but that is connected directly to the automatic control device embodied herein, the control device in time being operatively connected to the transmission 28 as aforementioned.

The automatic speed control device embodied in the present invention includes a control unit generally indicated at 32 that is mounted on the dashboard 14 and is operatively connected to the transmission 28 through a flexible cable 34. The flexible cable 34 extends through the floor board 16 and into the housing of the transmission 28, being operatively driven by any conventional type of driving means that is connected to the driven member of the transmission. Operatively connected to the control unit 32 and responsive to the rotation of the flexible shaft 34 is a flexible shaft 36 that extends into the speedometer 30 and controls the movement thereof to indicate the speed of the vehicle.

The control unit 32 is electrically connected to an accelerator unit generally indicated at 38 through an electrical cable 40, the accelerator unit 38 thereby being responsive to the operation of the control unit 32 for controlling the operation of the carburetor 22. The accelerator unit 38 is normally operated by movement of the accelerator pedal 20 that is operatively connected thereto through a bar 42, that extends through the floor board 16, a bell crank 44 and a rod 46. The accelerator unit is interposed between the rod 46 and a rod 48 that is connected directly to the carburetor 22 through a lever 50, the lever 50 being mounted on a fuel feed control member 52. It is seen that depression of the pedal 20 will rotate the bell crank 44 in the direction of the arrows thereby translating the rod 46, accelerator unit 38 and rod 48 to the left as seen in FIG. 1. The fuel feed control member 52 is then rotated to introduce more fuel into the engine cylinders.

*The Control Unit*

Referring now to FIGS. 2 through 8, the control unit 32 is illustrated in detail and comprises a circular housing 54 that is formed with a central partition 56 to define chambers 58 and 60. Secured to the left end of the housing 54 as seen in FIG. 2 and defining the rear end thereof is a rear wall 61, while the right or front end of the housing is closed by a front wall 62. The rear wall 61 is formed with outwardly projecting bosses 63 and 64 in which central openings are formed, bearings 66 and 68, respectively, being positioned in the central openings. Rotatably mounted in the bearing 66 is a stub shaft 69 in the outer end of which the flexible shaft 34 is secured. Secured to a reduced inner end portion of the stub shaft 69 is a spur gear 70 that engages a small central gear 72. The central gear 72 is secured to the reduced end 74 of a speed regulating member 76 to be described hereinafter, the reduced end 74 being rotatably mounted in a bearing 77 that is secured in an opening in the end wall 61. Drivingly engaging the gear 72 is a second spur gear 78 that is mounted on the reduced end of a stub shaft 80 that extends through the bearing 68, the flexible shaft 36 being secured to the outer end of the stub shaft 80 and being driven thereby. It is seen that the gear 70 is driven by the flexible shaft 34 through the stub shaft 69 and in turn drives the small gear 72 which drives the gear 78 to cause rotation of the flexible shaft 36, the flexible shaft 36 being operatively connected to the speedometer 30 for causing the operation thereof. Thus, the rotational speed of transmission 28 is always the same as that of speed regulating member 76 and speedometer cable 36.

Positioned in a central opening formed in the partition 56 is a bearing 82 that receives the other end of the speed regulating member 76, the bearing 82 cooperating with the bearing 77 to rotatably mount the member 76 therebetween. As illustrated in FIG. 2, the body of the member 76 is tubular in construction and receives an elongated speed regulating pin 84 therein, the exposed outer end of which extends somewhat beyond the free end of the member 76, as seen in FIG. 2, and into the chamber 60. Mounted on the tubular member 76 in sliding relation with respect thereto is a sleeve 86 that is formed with an annular flange 88 (FIG. 7) in which opposed slots 90 and 92 are formed. A pin 94 extends through horizontally extending openings 95 and 96 formed in the annular sleeve 88 and through a circular plug 97 secured to the inner end of the speed regulating pin 84 and thereby secures the sleeve 86 to the pin 84. The pin 94 projects through opposed longitudinally extending slots 98 and 99 formed in the wall of the member 76 and is longitudinally movable along said slots, thereby providing for relative movement of the sleeve 86 with respect to the member 76. Affixed to the sleeve 76 adjacent the partition 56 is an annular flange 100 in which opposed slots 101 and 102 are formed. Pivotally secured to the annular flange 100 in the slots 101 and 102, respectively, are links 103 and 104 which are joined at the outer ends thereof by links 106 and 108, respectively, that in turn are pivotally secured in the slots 90 and 92. Secured to the outer ends of the links 103 and 106 at their pivotal connection is a weight 110 while a weight 112 is secured to the outer ends of the links 104 and 108. In order to bias the movement of the regulating pin 84 as it is axially shifted due to varying speeds, a coil spring 114 is provided and is positioned interiorly of the tubular member around the regulating pin 84. One end of the coil spring abuts the plug 97, while the other end engages a lock ring 116 that is secured in the tubular member 76 adjacent the right or outer end thereof as seen in FIG. 2. It is seen that in the operation of the control unit 32 the gear 70 will be rotated by the flexible shaft 34 to rotate the gear 72, which thereby causes rotation of the tubular member 76. Since the sleeve 86 is longitudinally movable with respect to the member 76, the increased rotational speed of the member 76 will cause the weights 110 and 112 to move outwardly by centrifugal force. The outward movement of the weights 110, 112 causes pivotal movement of the links 106 and 108 with respect to the links 103 and 104, respectively, which movement causes the sleeve 86 to advance to the right as seen in FIG. 2, carrying the annular flange 88 therewith. Since the pin 94 is joined directly to the plug 97 that is fixed to the inner end of the speed regulating pin 84, the pin 84 will be caused to be moved to the right as seen in FIG. 2 against the action of the spring 114 as the speed of the vehicle increases.

In controlling the operation of the automobile, the present invention has two separate and distinct functions which are (1) operating the vehicle at a constant preselected speed; and (2) controlling the vehicle speed so that a predetermined limit is not exceeded. In controlling the vehicle to carry out the above stated functions, the axial or linear movement of the speed regulating pin 84 is utilized since this movement is a direct function of the rotational speed of the vehicle.

In both forms of speed control, the speed limit or preselected speed is determined by a common speed selector switch, indicated at 118, that is adapted to be actuated by the speed regulating pin 84. As shown in FIG. 2, the switch 118 is secured to a cylinder 120 by suitable screws 121, the cylinder 120 being slidably mounted within an opening formed in a boss 122 that is formed as part of the housing 54 and that extends into the chamber 60. The inner end of the cylinder 120 is provided with a recess in which a spring 124 is located which tends to bias the cylinder 120 and the switch 118 secured thereto to the right as seen in FIG. 2. Secured to the body of the switch 118 is a switch arm 126, the outer end of which is adapted to be engaged by the outer end of the speed regulating pin 84. Flanking the switch arm 126 are relatively short contact arms 128 and 130 on which suitable contacts are joined that are adapted to engage contacts secured to the switch arm 126. A spring 132 normally biases the switch arm 126 in contact with the contact arm 128, and, as will be described hereinafter, the contact arms 128 and 130 and the switch arm 126 are electrically connected to the other components of the electrical system to control the operation of the device.

It is seen that the position of the switch arm 126 with respect to the speed regulating pin 84 will determine at what vehicle speed the pin will engage and actuate said switch. Expressed differently, since the speed of the vehicle determines the extent of linear movement of pin 84, it follows that switch 118 may be selectively positioned so as to be automatically actuated in response to the vehicle obtaining a predetermined speed. In order to shift the switch 118 with respect to the speed regulating pin 84 so as to reposition the switch arm 126 with respect thereto, a speed control cam 136 is provided and as shown in FIG. 2 is formed with an inclined peripheral edge 137 that is adapted to engage the outer end of the cylinder 120, it being apparent that said cylinder will always be biased against said edge by virtue of spring 124. Joined directly to the speed control cam 136 is a reduced barrel 138 on the outer end of which a control knob 140 is secured by a set screw 142. As shown in FIG. 3, the control knob 140 is provided with graduations for indicating speed, the graduations being calibrated so that the rotary movement of the knob 140 will cause edge 137 to cam cylinder 120 to a position where switch arm 126 will be engaged and actuated by pin 84 at the vehicular speed indicated. More specifically, since the knob 140 is keyed directly to the barrel 138 through the set screw 142, rotation of the knob 140 will cause the cam 136 to be rotated. It is seen that since the edge 137 of the speed selector member 136 is inclined, rotary movement thereof will result in a corresponding axial movement of the cylinder 120 which carries the switch 118. Since the spring 124 tends to move the cylinder 120 to the right as seen in FIG. 2, it will be compressed upon movement of the cylinder 120 to the left. As the cylinder 120 shifts laterally carrying the switch 118 therewith, the switch arm 126 will be moved with respect to the speed regulating pin 84. As mentioned hereinabove, since the distance that the pin 84 is axially shifted is directly controlled by the rotational speed of the member 76, which in turn is a direct function of the speed of the vehicle, the greater the gap between the pin 84 and the switch arm 126, the greater the speed of the vehicle necessary to cause the pin 84 to contact the switch arm.

In order to select the operation of the speed control unit 32, that is, either limit speed or constant speed, an operation selector switch indicated at 144 in FIG. 4 is provided and includes contacts 146, 146a, 147, 147a and 148 that are adapted to be selectively engaged by a wiper arm 149 for producing the desired control. As will be described hereinafter, the contacts of the selector switch 144 are adapted to be electrically connected to the speed control switch 118 and are responsive thereto for controlling the accelerator unit 38. The selector switch wiper arm 149 is operatively connected to a selector dial 150 through an enlarged annular flanged disc 151 to which a reduced sleeve 152 is integrally joined. The selector dial 150 is spaced from the front end wall 62 of the housing 54 and engages the front side of the dashboard 14 of the automobile in bearing relation therewith and thereby cooperates with the end wall 62 to lock the control unit 32 to the dashboard 14. It is seen that upon rotary movement of the selector dial 150, the wiper arm 149 will be moved into contact with a set of the contacts 146, 146a or 147, 147a or with the "off" contact 148 to produce the selected operation. Formed on the outer face of the selector dial 150 are the letters "L," "C" and "N," and, as shown in FIGS. 3 and 11, the letter "L" indicates "limit" speed and is associated with the contacts 147 and 147a. The letter "C" indicates "constant" speed and is associated with the contacts 146, 146a, while the letter "N" indicates "normal" and is associated with contact 148. Formed on the face of the end wall 62 is a marking 154 with which the selector dial markings are adapted to be aligned, and upon movement of the selector dial, the selected operation will be obtained when the selected letter is in alignment with the marking 154.

Since the control device embodied herein is adapted to be utilized primarily in passenger vehicles, it is sometimes desirable to lock the selector dial 150 in the desired position and to furthermore lock the speed control dial 140 in the desired position so that only a designated speed will be obtained. This locking means has particular application when the automobile is to be used by a minor and it is desired that the vehicle not be operated at an undue speed, whereupon dial 150 is locked at "L" and speed control dial 140 is locked at the selected speed. In order to lock the selector dial 150 and the speed selector dial 140, it is only necessary to prevent the rotation thereof, and for this purpose a standard tumbler lock 156 that is adapted to receive a key 158 is provided. The lock 156 extends into the barrel 138 and is secured thereto by the screw 142. Engaging the lock 156 and movable therewith is a cylinder 160, the inner end of which has a flange portion 162 formed thereon. A pin 164 is secured to the flange 162 in eccentric relation with respect thereto and carries an arm 166 that extends upwardly therefrom as seen is FIGS. 2 and 5. Formed in the outer end of the arm 166 is a recess in which a pin 168 having a reduced end is positioned and that is adapted to be biased to an outer position by a spring 170. The upper end of the arm 166 is adapted to extend through a suitable opening in the speed control cam 136 and through a semicircular slot 172 (FIG. 5), a plurality of which are formed on the periphery of the flanged disc 151. Formed on the inner wall of the housing 54 adjacent the end wall 62 are a plurality of spaced grooves 174 into one of which the pin 168 is adapted to project in the locking operation. When the device is to be locked, the key 158 is rotated, which rotates the lock 156 and cylinder 160, thereby causing the eccentrically mounted arm 166 to move outwardly through the opening formed in the cam 136 into one of the slots 172 and at the same time causing pin 168 to extend into one of the grooves 174. Since the selector dial 150 is connected directly to the flanged disc 151 and the speed selector dial 140 is connected directly to the cam 136, the dials 140 and 150 are then locked in position and cannot be rotated. More specifically, arm 166 locks cam 136 to disc 151 thereby preventing relative rotation therebetween, while pin 168 interlocks with the fixed housing to prevent rotation of both elements. When key 158 is rotated to retract arm 166, pin 168 retracts from groove 174 and the end of arm 166 simultaneously retracts from slot 172 whereupon dials 140 and 150 and their associated elements are once again freed for rotation.

The Accelerator Unit

Referring now to FIGS. 1, 9 and 10, the accelerator unit 38 is illustrated and as shown includes a housing 180 which is provided with an opening 182 in one end thereof through which an elongated sleeve 184 extends, the sleeve 184 being fixed in the housing 180. Extending into the sleeve 184 is a speed control rod 186, the inner end of which is provided with a bore 188, in which a spring 190 is positioned. The spring 190 abuts against one end of the housing 180 and against the inner end of the bore 188 and thereby normally urges the speed control rod 186 to the right as seen in FIG. 9. A slot 192 is formed in the upper wall of the housing 180, and a pin 194 secured to the rod 186 extends through the slot 192 and cooperates therewith to define a limit for limiting the movement of the rod 186. Secured to the outer end of the rod 186 which extends outwardly of the end wall of the housing 180 and beyond the sleeve 184 is an enlarged end portion 196 in which the end of the accelerator rod 46 is secured by a set screw 198. For reasons which will hereinafter become apparent, collar 196 and set screw 198 enable rod 46 to be adjustably connected to rod 186. Formed on the underside of the rod 186 is a notch 200 into which a plunger 202 is adapted to extend, the plunger 202 being joined to an armature 204 of a speed-limit control solenoid 206. A disc 208 is secured to the plunger 202 and engages a spring 210 which bears against a wall 212 to normally bias plunger 202 to its outwardly extending position wherein it engages notch 200.

A cable 214 is electrically connected to the windings of the solenoid 206 and to the electrical circuit of the control device and is adapted to supply the current for energizing the solenoid 206. The solenoid armature 204 is normally maintained in the position as shown in FIG. 9, the spring 208 biasing the plunger 202 into the notch 200, thereby causing the accelerator rod 46 and speed control rod 186 to be operatively engaged with the housing 180. When the solenoid 206 is energized upon application of current thereto, the solenoid armature 204 is withdrawn, causing the spring 210 to be compressed and thereby withdrawing the plunger 202 from the notch 200. It is seen that upon removal of the plunger 202 from the notch 200, the rod 46 becomes disconnected from rod 48, or, expressed differently, movement of rod 46 will simply cause rod 186 to move freely with respect to housing 180 whereupon no movement will be imparted to rod 48. On the other hand, when plunger 202 is in engagement with notch 200, movement of rod 46 in the direction of the arrow (FIG. 9) will cause corresponding movement of housing 180 and rod 48. The purpose and operation of the solenoid 206 as it effects the speed limit control of the device will be discussed hereinafter.

Also disposed in the housing 180 is a constant speed solenoid 216, the windings of which are electrically connected to an electrical lead 217 that is carried by the cable 214. Extending between the windings of the solenoid 216 is a housing 218 in which an armature 220 is positioned. Joined to the armature 220 is a constant speed control rod 224 to which a disc 226 is secured. A collar 228 is secured within the outer end of a reduced extension 230 of the housing 218 and is connected directly to the rod 224. A spring 232 is interposed between the disc 226 and the inner end of collar 228, and upon movement of the armature 220 to the right as seen in FIG. 9 the spring is compressed and will act to withdraw the armature 220 upon deenergization of the solenoid 216. The carburetor control rod 48 that is connected to the lever 50 of the carburetor 22 is secured to the collar 228 by a set screw 234, and it is seen that upon energization of the solenoid 216 the armature 220 will be drawn to the right as seen in FIG. 9, thereby causing the rod 48 to be moved therewith. Movement of the rod 48 causes the carburetor lever to be pivotally moved, thereby effecting a change in the feeding of the fuel into the engine cylinders. Interposed between the solenoid 206 and the solenoid 216 is a chamber defined by an intermediate housing 236 in which a diaphragm 238 is positioned, the diaphragm 238 being connected to the armature 220 through a bolt 240 that extends through the inner wall of the solenoid housing. The diaphragm 238 is provided so that movement of the armature 220 upon deenergization of the solenoid 216 will be damped so as to prevent surges in movement of the bar 48, thereby resulting in relatively smooth fuel feed at all times. An air bleed 239 is provided in the wall of intermediate housing 236 in order to enable diaphragm 238 to operate.

The Electrical Circuit

Referring now to FIG. 11, the electrical system is diagrammatically illustrated and will be described in connection with the control unit 32 and the accelerator unit 38 to further show the interrelation of these units and the component parts thereof. The switch arm 126 is electrically connected to a brake switch 242 through a lead 244, the brake switch being shown in FIG. 1 located beneath a brake lever 246 on which the brake pedal 18 is mounted. Brake switch 242 is located in series with a fuse 248 and an on-off ignition switch 250, which in turn is electrically connected to the battery 252 of the automobile. The operation selector switch 144 is electrically connected to the speed selector switch 118, contact 147a of the limit contacts being connected to the contact arm 130 through a lead 254. Contact 146a of the constant speed contacts is similarly connected to the contact arm 128 of the speed selector switch 118 through a lead 256. The other contact 147 of the limit contacts is connected to a lead 258 that, in turn, is electrically connected to the solenoid 206. Similarly, the other contact 146 of the constant speed contacts is electrically connected to the solenoid 216 through a lead 260. Both the solenoids 206 and 216 are connected to a lead 262 that goes to ground. The neutral or normal contact 148 in the operation selector switch 144 is disconnected from the circuit, and thus, when the selector arm 146 makes contact therewith, the speed control device is inoperative, and the automobile may be operated in its usual manner.

When the device is being operated in the limit-speed position, which in effect governs the maximum speed at which the automobile may travel, it is sometimes desirable, such as when passing on the open road, to momentarily disconnect the limit speed circuit so that the accelerator may be operated to cause the vehicle to accelerate rapidly for a brief period of time during the passing action. In order to cut out the operation of the control device, an accelerator switch indicated at 264 is provided and as shown is a double-pole single-throw switch. Electrically connected to one side of the switch 264 is a heat-resistant wire 266 to which a bimetallic switch 268 of conventional design is connected in series. As shown in FIG. 2, these components are physically located within a capsule 269 positioned in the chamber 60 of the control unit 32, which capsule may be replaced as desired. When the accelerator switch 264 is closed, it is seen that a circuit is completed from the contact 130 against which the switch arm 126 has been moved through lead 270, switch contacts 271, 271a, leads 272, 273, switch 268 and lead 260. This completes the circuit to the solenoid 216 which controls the movement of control rod 224 and the rod 48 that is connected to the carburetor 22. Thus, depression of the accelerator pedal 20 downwardly to the floor board will close the switch 264, thereby energizing solenoid 216 and effecting sufficient movement of the rod 48 to cause an increased amount of fuel to be fed by the carburetor during the passing action of the automobile.

Closing of the switch 264 also closes contacts 274, 274a that complete a circuit through the resistance wire 266 whereupon said wire becomes heated and causes opening of bimetallic switch 268 after a predetermined time interval, thus breaking the circuit to solenoid 216.

Since the speed of the vehicle is increased during this interval beyond the predetermined limit, the speed regulating pin 84 is moved to cause the switch arm 126 to engage contact arm 130. The solenoid 206 is then energized to withdraw the plunger 202 from engagement with the rod 186 whereby the accelerator unit is disconnected from the accelerator pedal 20. Because of the construction of the bimetallic switch 268, the switch 268 will cut out after a brief interval due to the increased heat generated by the heat-resistant wire 266. As aforestated, this breaks the circuit to the solenoid 216 and causes the control device to resume its previous limit-speed operation. It is seen that the heat-resistant wire 266 and switch 268 act to prevent circumventing of the control system by use of the burst control or accelerator switch 264 by only allowing acceleration for a brief interval to provide for emergency situations, such as when passing another vehicle.

*Operation*

In the operation of the speed control device, the ignition switch 250 is turned to the "on" position, and the operation selector dial 150 is then rotated to the selected position for controlling the speed of the automobile in the desired manner. Assuming in the first instance that it is desired to operate the automobile at a constant speed, the selector dial 150 is rotated until the "C" is in alignment with the mark 154. In this position, the switch arm 149 engages the "C" contacts 146, 146a as seen in dotted lines in FIG. 11. The desired speed is then selected by rotating the speed selector dial 140 until the miles per hour indicated on the dial is in alignment with the marking 154. Rotation of the dial 140 moves the cam 136 to locate the cylinder 120 and switch 118 carried thereby in position relative to the pin 84. It is understood that the position of the switch 118 and the cam 136 have been calibrated with respect to the position of the pin 84 to obtain the settings on the dial 140. The motor of the automobile operating the transmission 28 causes the flexible cable 34 to rotate the gear 70 which in turn rotates the gear 72 that imparts rotation to the member 76. The gear 78 is also rotated which causes rotation of the flexible cable 36 that is connected directly to the speedometer 30. As the member 76 rotates, the weights 106 and 112 are moved outwardly through centrifugal force to cause the sleeve 86 to be moved to the right as seen in FIG. 2. Movement of the sleeve 86 to the right carries the connecting pin 94 and the speed regulating pin 84 therewith.

When the device is to be operated at a constant speed, the switch arm 126 is positioned in contact with the contact arm 128 and the spring 132 normally retains the switch arm 126 in this position. With the switch arm 126 contacting the contact arm 128, current is directed to the solenoid 216 by way of the lead 256, the constant speed contacts 146, 146a and the lead 250. The rod 224 of the solenoid 216 is then moved to the right viewing FIG. 9 to cause a corresponding movement in the rod 48, thereby increasing the flow of fuel into the carburetor 22, causing the automobile is steadily pick up speed. When the speed of the automobile exceeds the limit as set on the dial 140, the speed regulating pin 84 moves the switch arm 126 out of engagement with the contact arm 128, thereby breaking the circuit to the solenoid 216. The solenoid is then deenergized, causing rod 224 to move back under the action of spring 230, thus causing movement of rod 48 to reduce flow of fuel to the carburetor, as well as the speed of the automobile. During this action, the diaphragm 238 dampens the movement of the solenoid plunger so that surges are prevented and a smooth and even flow of fuel through the carburetor is effected. It is seen that every time the speed of the automobile exceeds the predetermined limit, the circuit to the solenoid 216 will be broken, thereby decreasing the speed of the automobile, while every time the speed of the automobile is less than that called for, the circuit to solenoid 216 will once again be closed, whereupon said solenoid will be energized to once again increase the flow of fuel to the carburetor. Thus, when the control device is set at constant speed, it will be seen that the circuit to solenoid 216 will constantly be opening and closing as the car speed exceeds and drops below, respectively, the predetermined selected speed.

Since the speed of the automobile is controlled completely by the aforedescribed operation of solenoid 216, it is not necessary for the operator to place his foot on the accelerator pedal, thereby reducing the fatigue and inconvenience which usually result from driving at a constant speed over any appreciable distance. On the other hand, it will be apparent that any time it is desired to accelerate beyond the constant speed setting, it is simply necessary to step on the accelerator pedal, since this setting in no way interrupts the connection between the pedal and the carburetor. Upon removal of the operator's foot from the pedal, the car will once again automatically resume the selected constant speed. When it is desired to slow down or stop, depression of the brake pedal 18 actuates switch 242 to break the circuit thereby rendering the constant speed setting inoperative. It has been found that the fluctuation in speed when on constant speed control is less than one m.p.h. on either side of the selected speed. It is also emphasizd that the same speed will be maintained whether going up hills, around curves, etc., and it is even possible to change the speed setting while the car is in motion.

When the device is to be operated so that a predetermined speed cannot be exceeded even by movement of the accelerator pedal 20, the operation selector arm 149 is moved to the limit speed position by rotating the dial 150 to the "L" position. The speed selector dial 140 is then set at the speed desired and locked in this position by the key 158. Once the key 158 is removed from the lock 156, the speed limit is established and cannot be exceeded until the lock 156 is unlocked nor can the selector dial 150 be rotated. In operation, if the automobile should approach the selected speed, the speed regulating pin 84 moves the switch arm 126 into engagement with contact arm 130. The circuit is then complete through the switch arm 126, contact arm 130, lead 254, contacts 147, 147a, wiper arm 149, lead 258 and solenoid 206. The plunger 202 is then withdrawn from the notch 200 to remove the rod 186 from operating movement with respect to the housing 180 of the accelerator unit 38. Even though the accelerator pedal may be pressed inwardly, movement of the rod 46 will have no effect on moving the accelerator housing 180 or the rod 48. Thus it is seen that the selected speed will not be exceeded and that only when the speed of the vehicle is decreased below the predetermined limit will the switch arm 126 be returned to engagement with the contact arm 128 by the spring 132 thereby causing the circuit to the solenoid 206 to be broken. Operation of the carburetor control rod 48 is then resumed through the pedal 20, rod 42, bell crank 44, rod 46 and accelerator unit 38.

As hereinbefore described, if at any time during the operation of the device it is necessary to brake the automobile, the brake pedal 18 is depressed thereby causing the brake lever 246 to engage the switch 242. The switch 242 is thus opened to open the circuit to the lead 244 which in effect breaks the circuit between the battery 252 and the control unit 32. Upon release of the brake pedal 18 from the braking position, the control unit 32 is then electrically connected to the battery 252 once again to cause the operation of the control unit to be resumed in the manner as previously set forth. If the automobile should be of the standard transmission type, a second switch 243 is positioned beneath the clutch pedal, whereupon depression of the clutch pedal will open the switch 243 in the same manner that depression of brake pedal 18 opens switch 242. Thus in a standard transmission car, depression of either the brake or clutch pedal will automatically open the circuit to the control device to render same inoperative.

During the operation of the device in the speed limit position, it may be desirable or necessary to momentarily disconnect the governing mechanism, such as when the automobile is to pass another vehicle on the open road. In this event, the acceleration switch 264 is provided and is positioned directly below the accelerator pedal 20. The accelerator switch 264 is closed when the accelerator pedal 20 is depressed all the way to the floor board. As the accelerator pedal 20 is pressed downwardly, the rotational speed of the tubular member 76 is increased to cause the speed regulating pin 84 to move the switch arm 126 in contact with the contact arm 130. Current is then caused to flow through the lead 254, lead 270, lead 272 and then through the bimetallic switch 268, lead 273, lead 260 and into the solenoid 216. As hereinbefore described, energization of solenoid 216 actuates control rod 48 to produce a momentary increase of fuel into the engine cylinders. At the same time, current flows through the lead 254, lead 258 and into the solenoid 206 to withdraw the plunger 202 from the notch 200, thereby disconnecting the accelerator rod 46 from engagement with the accelerator unit 38. Because of the heat-resistance wire 266, the bimetallic switch 268 is soon heated sufficiently to break the circuit to the solenoid coil 216, thereby retracting the rod 48 with respect to the carburetor 22. It is understood that sufficient time is provided for passing after the acceleration switch 264 is closed before the bimetallic switch 268 is caused to open and deenergize the solenoid 216. As soon as the circuit through the switch 268 is opened, the speed limit control takes over to govern the speed of the automobile as previously set forth.

Reviewing exactly what happens when switch 264 is actuated, it will be understood that depression of the accelerator pedal by the operator will cause rod 46, accelerator unit 38, and rod 48 all to move to the right (in the direction of the arrow) as viewed in FIG. 9, until the predetermined limit speed is attained. As long as the rod 46, accelerator unit 38 and rod 48 are interconnected and moving as a unit, it will be clear that depression of the accelerator pedal will control operation of the throttle valve, and hence the speed of the vehicle. Once the predetermined limit speed has been attained, solenoid 206 is automatically energized to retract plunger 200 whereby rod 46 and accelerator unit 38 become disconnected. At this very moment, the operator's foot will still be depressing the accelerator pedal, whereupon rod 46 is maintained against movement from right to left, viewing FIG. 9. Since rod 46 cannot move, spring 190 causes accelerator unit 38 to move to the left, viewing FIG. 9, the limit of such movement being determined by the amount of movement necessary to completely close the throttle valve. Thus, upon disconnection of rod 46 and accelerator unit 38 by means of retraction of solenoid plunger 200, accelerator unit 38 will move from right to left, viewing FIG. 9, under impetus of spring 190 until the throttle valve is completely closed. The amount of this movement will determine the position of pin 194 in slot 192, it being understood that the pin will now be located at a point intermediate the length of the slot. Now, when the operator desires an additional burst of speed, the accelerator pedal will be further depressed until it reaches the floor, at which time the accelerator switch is actuated to energize solenoid 216. Rod 46 is adjusted with respect to rod 186 by means of collar 196 and screw 198 so that when the accelerator pedal is completely depressed, pin 194 will be at the extreme right end of slot 192. Therefore, when solenoid 216 is energized, accelerator unit 38 is anchored against movement from right to left, viewing FIG. 9, due to the fact that pin 194 is engaging the right-hand end of slot 192. Since the accelerator unit 38 cannot move from right to left, then it follows that energization of solenoid 216 will automatically cause rod 48 to be carried from left to right, thereby opening the throttle valve.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a motor vehicle having an accelerator, a carburetor, and drive means controlled thereby, means releasably connecting said accelerator to said carburetor, means responsive to said drive means reaching a predetermined speed for disconnecting said connecting means whereby the carburetor is no longer controlled by the accelerator, means operable for momentarily controlling the feed of additional fuel to the carburetor whereby said drive means may momentarily exceed said predetermined speed, said last mentioned means being operable while said connecting means are disconnected, and means for automatically limiting operation of said last mentioned means to a predetermined time interval.

2. In a motor vehicle having an accelerator, a carburetor and an automotive drive controlled thereby, speed control means comprising a shaft drivingly engaged by the automotive drive, a pin slidably connected to said shaft for longitudinal movement with respect thereto, means for controlling the movement of said pin whereby the amount of movement of the latter is determined by the rotational speed of said shaft, and a speed selector switch positioned in the path of movement of said pin for actuation thereby, the position of said switch being adjustable whereby said switch may be selectively positioned so as to be actuated when the automotive drive reaches a predetermined speed, means releasably connecting said accelerator to said carburetor, means controlled by actuation of said speed selector switch for disconnecting said connecting means, whereby the carburetor is no longer controlled by the accelerator, means operable for momentarily controlling the feed of additional fuel to the carburetor whereby said drive means may momentarily exceed said predetermined speed, said last mentioned means being operable while said connecting means are disconnected, and means for automatically limiting operation of said last mentioned means to a predetermined time interval.

3. The combination of claim 2 further characterized in that adjustment of said speed selector switch is made by means of a rotary cam.

4. In a motor vehicle having an accelerator and a carburetor controlled thereby, an accelerator unit interposed between said accelerator and carburetor, said accelerator unit having a releasable connection with said accelerator whereby when said accelerator unit and accelerator are connected, operation of said accelerator will control said carburetor through movement of said accelerator unit, whereas when said accelerator unit and accelerator are disconnected, operation of said accelerator will have no effect on said carburetor, said accelerator unit further having means relatively movable with respect to said unit for operating said carburetor completely independent of any movement of said accelerator and said accelerator unit, and means for automatically limiting operation of said relatively movable means to a predetermined time interval.

5. The combination of claim 4 further characterized in that said releasable connection comprises a solenoid which moves a plunger between a first position wherein said unit is locked to said accelerator whereby they move in unison to operate said carburetor, and a second position wherein said unit is released from said accelerator so that movement of the latter has no effect on the former, said independent operating means comprising a second solenoid having a plunger connected to said carburetor control, said second solenoid plunger also serving to interconnect said unit and said carburetor control when said accelerator and said unit are in locked relation.

6. In a motor vehicle having an accelerator, a carburetor, and drive means controlled thereby, speed control means selectively operable to limit the vehicle to a predetermined speed or to automatically maintain the vehicle at a constant speed, said speed control means having a control unit operatively connected to the drive means and responsive thereto, said control unit including speed responsive means, means operatively engaging said speed responsive means and movable in response thereto, a speed selector switch automatically actuated by said movable means when the vehicle reaches a predetermined speed, an accelerator unit interposed between said accelerator and carburetor, said accelerator unit having a releasable connection with said accelerator whereby when said accelerator unit and accelerator are connected, operation of said accelerator will control said carburetor through movement of said accelerator unit, whereas when said accelerator unit and accelerator are disconnected, operation of said accelerator will have no effect on said carburetor, said accelerator unit further having means for operating said carburetor completely independent of any movement of said accelerator, an operation switch selectively movable to a limit-speed or constant-speed position, first circuit means operable when said operation switch is in limit-speed position to cause said accelerator unit to become disconnected from said accelerator upon actuation of said speed selector switch, and second circuit means operable when said operation switch is in constant-speed position to actuate said independent operating means, means connecting said independent operating means to said speed selector switch whereby actuation of the latter renders the former inoperative.

7. The combination of claim 6 further characterized in that means are provided when said operation switch is in limit-speed position for momentarily actuating said independent operating means after actuation of said speed selector switch, whereby said predetermined speed may be momentarily exceeded.

8. In a motor vehicle having an accelerator, a carburetor, and drive means controlled thereby, speed control means selectively operable to limit the vehicle to a predetermined speed or to automatically maintain the vehicle at a constant speed, said speed control means having a control unit comprising a shaft drivingly engaged by the automotive drive, a pin slidably connected to said shaft for longitudinal movement with respect thereto, means for controlling the movement of said pin whereby the amount of movement of the latter is determined by the rotational speed of said shaft, and a speed selector switch positioned in the path of movement of said pin for actuation thereby, the position of said switch being adjustable whereby said switch may be selectively positioned so as to be actuated when the automotive drive reaches a predetermined speed, an accelerator unit interposed between said accelerator and carburetor, said accelerator unit having a releasable connection with said accelerator whereby when said accelerator unit and accelerator are connected, operation of said accelerator will control said carburetor through movement of said accelerator unit, whereas when said accelerator unit and accelerator are disconnected, operation of said accelerator will have no effect on said carburetor, said accelerator unit further having means for operating said carburetor completely independent of any movement of said accelerator, an operation switch selectively movable to a limit-speed or constant-speed position, first circuit means operable when said operation switch is in limit-speed position to cause said accelerator unit to become disconnected from said accelerator upon actuation of said speed selector switch, and second circuit means operable when said operation switch is in constant-speed position to actuate said independent operating means, means connecting said independent operating means to said speed selector switch whereby actuation of the latter renders the former inoperative.

9. In a motor vehicle having an accelerator, a carburetor, and drive means controlled thereby, speed control means selectively operable to limit the vehicle to a predetermined speed or to automatically maintain the vehicle at a constant speed, said speed control means having a control unit comprising a shaft drivingly engaged by the automotive drive, a pin slidably connected to said shaft for longitudinal movement with respect thereto, means for controlling the movement of said pin whereby the amount of movement of the latter is determined by the rotational speed of said shaft, and a speed selector switch positioned in the path of movement of said pin for actuation thereby, the position of said switch being adjustable whereby said switch may be selectively positioned so as to be actuated when the automotive drive reaches a predetermined speed, an accelerator unit interposed between said accelerator and carburetor, a first solenoid in said accelerator unit having a plunger movable between a first and normal position wherein said accelerator unit is locked to said accelerator whereby they move in unison to operate said carburetor, and a second position wherein said accelerator unit is released from said accelerator so that movement of the latter has no effect on the former, said accelerator unit having a second solenoid for operating said carburetor completely independent of any movement of said accelerator, an operation switch selectively movable to a limit-speed or constant-speed position, and a circuit electrically interconnecting said operation switch, said speed selection switch and said accelerator unit, whereby when said operation switch is in limit-speed position, actuation of said speed selector switch causes said first solenoid to move its plunger to its said second position, and when said operation switch is in constant-speed position, said second solenoid is normally operative to operate said carburetor and feed fuel, actuation of said speed selector switch automatically rendering said second solenoid inoperative.

10. The combination of claim 9 further characterized in that said circuit comprises means for momentarily rendering said second solenoid operative when said operation switch is in limit-speed position and after actuation of said speed selector switch.

References Cited in the file of this patent

UNITED STATES PATENTS

| | | |
|---|---|---|
| 1,634,069 | Cordray | June 28, 1927 |
| 1,824,292 | Murrow | Sept. 22, 1931 |
| 2,214,567 | Rosenthal | Sept. 10, 1940 |
| 2,236,145 | Kolb | Mar. 25, 1941 |
| 2,313,505 | Benjamin | Mar. 9, 1943 |
| 2,410,998 | Reavis | Nov. 12, 1946 |
| 2,714,880 | Riley | Aug. 9, 1955 |
| 2,776,722 | Germanich | Jan. 8, 1957 |
| 2,822,881 | Treharne | Feb. 11, 1958 |